H. J. GILBERT.
PULLEY.
APPLICATION FILED MAY 23, 1904.

910,527.

Patented Jan. 26, 1909.

2 SHEETS—SHEET 1.

Witnesses
Edw. P. Barrett
Louis B. Erwin

Inventor
H. J. Gilbert
By Rector & Hibben
His Atty's

H. J. GILBERT.
PULLEY.
APPLICATION FILED MAY 23, 1904.
910,527.
Patented Jan. 26, 1909.
2 SHEETS—SHEET 2.
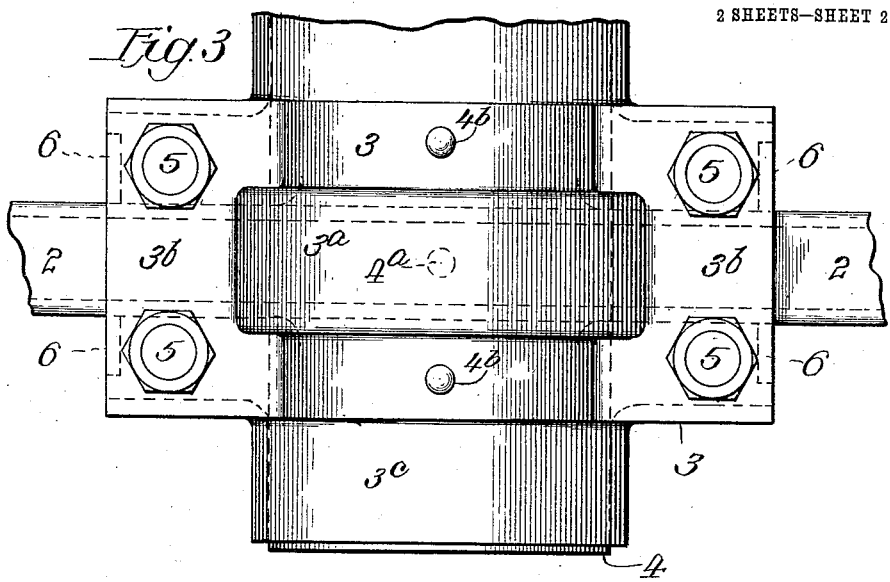
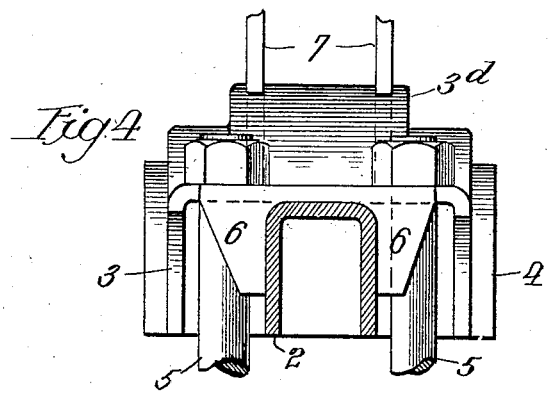
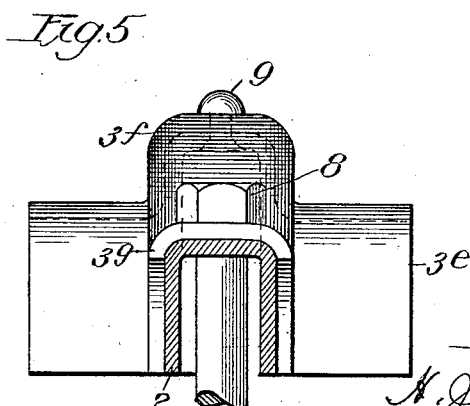
Witnesses:
Edw. R. Barritt
Louis B. Erwin
Inventor
H. J. Gilbert
By Rector & Hibben
His Atty's.

UNITED STATES PATENT OFFICE.

HENRY J. GILBERT, OF SAGINAW, MICHIGAN.

PULLEY.

No. 910,527.  Specification of Letters Patent.  Patented Jan. 26, 1909.

Application filed May 23, 1904. Serial No. 209,338.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention relates to sheet metal pulleys, more particularly those of the split or sectional type, and the object thereof is to produce a pulley of this character which shall be simple and inexpensive of manufacture but durable and efficient in practical use, all as will be apparent from the description hereinafter given.

Figure 1:
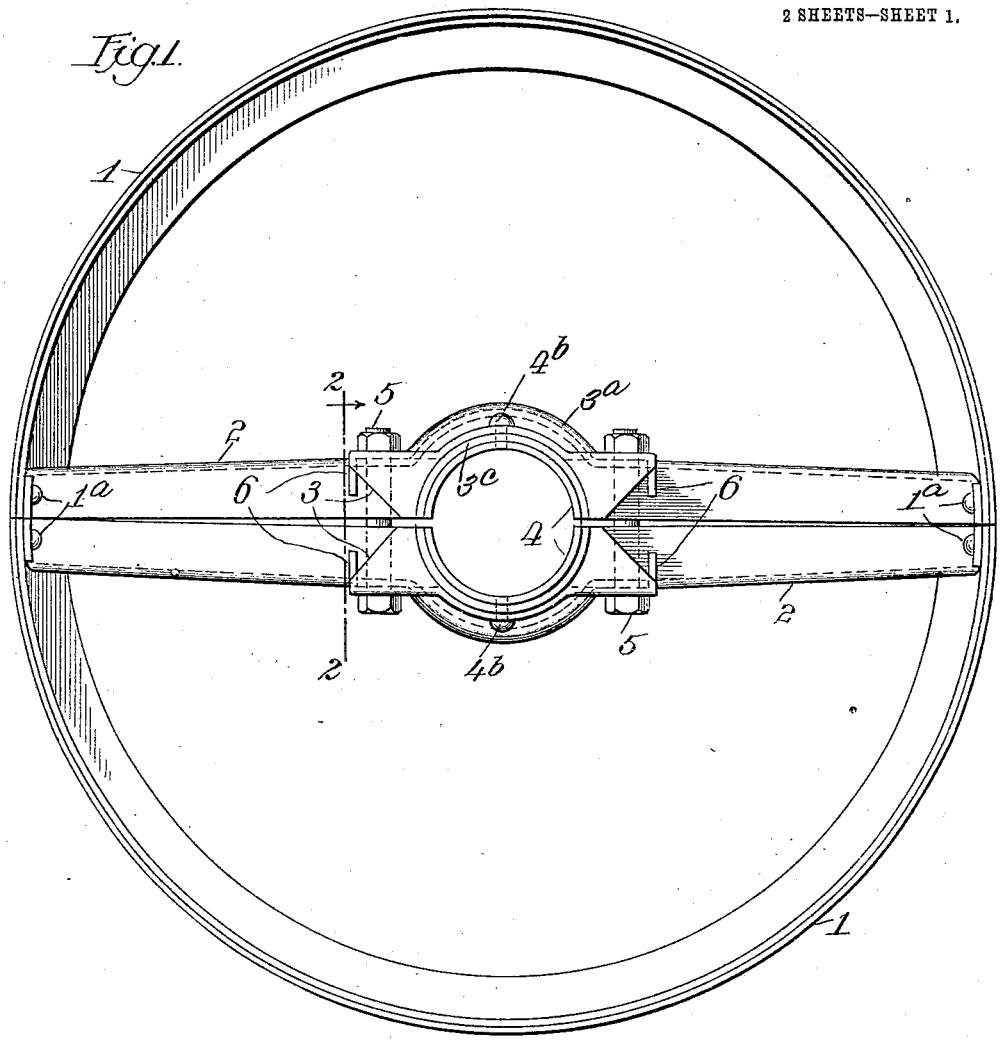
Figure 2:
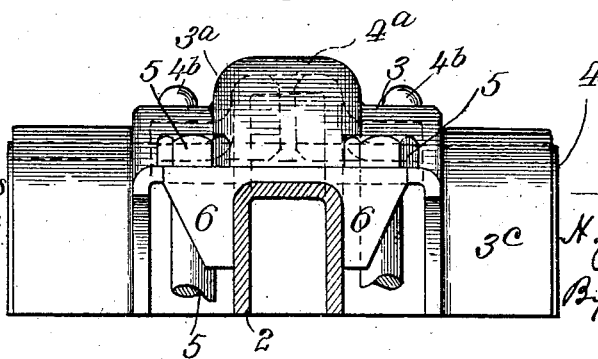

In the drawings, Figure 1 is a side elevation of my improved pulley; Fig. 2 a section on the line 2 of Fig. 1; Fig. 3 a plan view of one of the hub clamping sections; Fig. 4 a sectional elevation illustrating a modified form of hub section for use in connection with supplemental spoke arms; and Figs. 5 and 6 detail views of a modified form of hub section or clamp where only a single set or pair of clamping bolts is used.

My pulley comprises, in the present instance and as illustrated in Figs. 1, 2 and 3, the rim segments 1, the pair of transverse spoke arms 2, and the pair of hub sections or clamps 3, together with the sectional hub thimble 4, which may or may not be used as desired. The number of pairs of these spoke arms employed as well as the pairs of hub sections may be increased according to the width of any particular rim or according to the strength desired.

The spoke arms are made of channel irons or bars and are arranged flange to flange, that is, arranged with their flanges directed inwardly toward each other and toward the division line of the pulley. These spoke arms are expanded centrally to form the shaft opening and to receive the hub thimble where the latter is employed, such thimble being, by preference, secured, as shown, to the spoke arms by rivets $4^a$. The spoke arms are connected at their outer ends to the rim segments in any suitable manner, and as the particular connection thereof forms no part of my present invention a detailed description and illustration in this respect are unnecessary, and it suffices to say that these spoke arms are connected, in the present instance, to the rim segments by means of the rivets $1^a$ as seen in Fig. 1.

The hub sections, to which my present invention is particularly directed, are similar in construction and arranged to fit over upon the middle or hub portions of the spoke arms and to be held or clamped together by the clamping bolts 5 which, in the form illustrated in Figs. 1, 2 and 3, are four in number arranged in two pairs on either side of the spoke arms.

Each hub section is substantially double U-shape in cross-section, with its inner and smaller portion $3^a$ fitting snugly upon the expanded or hub portion of its spoke arm, as clearly indicated in Fig. 2, while its outer portion $3^b$ is considerably wider than its spoke arm with its top resting upon the top of its spoke arm. In order to support its spoke arm and prevent lateral displacement thereof, the ends of each hub section have a pair of parallel tongues 6 which are inwardly folded toward the division line of the pulley. These tongues are separated a distance just equal to the width of the spoke arm, with the result that when they are infolded, as described, their inner adjacent and parallel edges bear against the outer parallel sides of the spoke arm. The outer flat surfaces of each hub section form bolt boxes through which the clamping bolts pass.

As indicated clearly in Figs. 2 and 3, each of the hub sections has two opposite and laterally directed semi-circular flanges $3^c$ corresponding with the shaft opening and fitting upon the hub thimble when the latter is employed, but, as will be understood, these flanges may serve the purposes of a hub thimble, permitting the latter to be dispensed with. The hub sections may be secured to said lateral flanges of the spoke arms by means of the rivets $b^4$ which may, if desired, also extend through the hub thimble when the latter is used.

The hub sections, above described, are designed to accommodate a single pair of spoke arms, but in case supplemental spoke arms at right angles to the main spoke arms shown in Fig. 1 are employed, such as the supplemental spoke arms 7 of Fig. 4, then the central expanded portion of each hub clamp or section is made enough wider to receive these supplemental spoke arms which are passed through their hub sections. As indicated in Fig. 4, this expanded portion $3^d$ of the hub section receives its spoke arm, as in the other instance, and in addition the spoke arms 7 on either side of its spoke arm.

My principle of hub section may be embodied in a form of clamp or section having only a single set or pair of clamping bolts, instead of the double set illustrated in Fig. 3. In Fig. 5 I have shown such a hub section for a single set of bolts, the same comprising the semi-cylindrical portion $3^e$ and centrally and longitudinally expanded portion $3^f$, the latter fitting upon and engaging the spoke arm 2. The ends of each hub section are flat and rest upon the flat top of its spoke arm. Such ends also have marginal flanges $3^g$ inwardly turned to engage the spoke arm in the manner clearly indicated in Fig. 5. The clamping bolts 8 in this particular construction pass through the hub clamps or sections and also through the spoke arms 2. In the particular instance, also, the hub clamps or sections are secured to their spoke arms by rivets 9.

I claim:

1. A pulley comprising a rim, spoke arms extending substantially diametrically of the pulley and approximately U-shape in cross section and connected with the rim, such arms being centrally expanded to form the shaft opening, and hub sections coöperating with the spoke arms and each comprising a substantially U-shaped clamp fitting upon its spoke arm and having an expanded portion arranged to engage the expanded central portion of such spoke arm by fitting the outer face and opposite sides thereof; substantially as described.

2. A pulley comprising a rim, spoke arms extending substantially diametrically of the pulley and approximately U-shape in cross section and connected with the rim, such arms being centrally expanded to form the shaft opening, and hub sections coöperating with the spoke arms and each comprising a substantially U-shaped clamp fitting upon its spoke arm and having an expanded portion arranged to engage the expanded central portion of such spoke arm by fitting the outer face and opposite sides thereof, each of said hub sections having laterally directed semi-circular flanges corresponding with the shaft opening; substantially as described.

3. A pulley comprising a rim, spoke arms approximately U-shape in cross section and connected therewith, such arms being centrally expanded to form the shaft opening, hub sections coöperating with the spoke arms and each comprising a substantially U-shaped clamp fitting upon its spoke arm and having an expanded portion closed at its top and arranged to engage the expanded central portion of such spoke arm by fitting the outer face and opposite sides thereof, and a hub thimble upon which such hub sections are clamped; substantially as described.

4. A pulley comprising a rim, spoke arms extending substantially diametrically of the pulley and approximately U-shape in cross section and connected with the rim, such arms being centrally expanded to form the shaft opening, hub sections coöperating with the spoke arms and each comprising a substantially U-shaped clamp having an expanded portion closed at its top and arranged to engage the expanded central portion of its spoke arm and having a flat portion for clamping purposes and fitting upon the spoke arm, and clamping bolts passed through the hub sections for clamping them together; substantially as described.

5. A pulley comprising a rim, spoke arms extending substantially diametrically of the pulley and approximately U-shape in cross section and connected with the rim, such arms being centrally expanded to form the shaft opening, hub sections coöperating with the spoke arms and each comprising a substantially U-shaped clamp having an expanded portion closed at its top and arranged to engage the expanded central portion of its spoke arm and having a flat portion for clamping purposes and fitting upon the spoke arm, said hub sections having means for preventing lateral displacement of the spoke arms, and clamping bolts passed through the hub sections for clamping them together; substantially as described.
6. A pulley comprising a rim, spoke arms approximately U-shaped in cross section and connected therewith, such arms being centrally expanded to form the shaft opening, hub sections coöperating with the spoke arms and each comprising a substantially U-shaped clamp having an expanded portion arranged to engage the expanded central portion of its spoke arm and having a flat portion for clamping purposes, said hub sections having at their ends means for engaging the spoke arms and preventing the lateral displacement of the latter, consisting of two separate inturned tongues at each end, and clamping bolts passed through the hub sections for clamping them together; substantially as described.

7. A pulley comprising a rim, spoke arms approximately U-shape in cross section and connected therewith, such arms being centrally expanded to form the shaft opening, hub sections coöperating with the spoke arms and each comprising a substantially U-shaped clamp having an expanded portion arranged to engage the expanded central portion of its spoke arm and having a flat portion for clamping purposes, said hub sections having infolded tongues arranged to bear against the opposite sides of the spoke arms, and clamping bolts passed through the hub sections for clamping them together; substantially as described.

8. A pulley comprising a rim, spoke arms approximately U-shape in cross section and connected therewith, such arms being centrally expanded to form the shaft opening, hub sections coöperating with the spoke arms and each comprising a substantially U-shaped clamp having an expanded portion arranged to engage the expanded central portion of its spoke arm and having a flat portion for clamping purposes, said hub sections having pairs of infolded tongues provided with straight parallel surfaces arranged to bear against the opposite parallel sides of the spoke arms, one pair of such tongues being arranged at each end, and clamping bolts passed through the hub sections for clamping them together; substantially as described.

9. A pulley comprising a rim, spoke arms extending substantially diametrically of the pulley and approximately U-shape in cross section and connected with the rim, such arms being centrally expanded to form the shaft opening, hub sections coöperating with the spoke arms and each comprising a substantially U-shaped clamp having an expanded portion arranged to engage the expanded central portion of its spoke arm and having a flat portion for clamping purposes and fitting upon the spoke arm, means for securing the spoke arms and hub sections together, and clamping bolts for clamping the hub sections together; substantially as described.

10. A pulley comprising a rim, spoke arms approximately U-shape in cross section and connected therewith, such arms being centrally expanded to form the shaft opening, hub sections coöperating with the spoke arms and each comprising a substantially U-shaped clamp having an expanded portion arranged to engage the expanded central portion of its spoke arm and having a flat portion for clamping purposes, said hub sections having means for preventing lateral displacement of the spoke arms, comprising a pair of tongues 6 at each end, and pairs of clamping bolts passed through said sections on either side of the spoke arms; substantially as described.

11. A split pulley, each half comprising a rim segment 1, spoke arm 2 extending substantially diametrically and approximately U-shaped in cross section, such arm being centrally expanded to form a shaft opening, a hub section comprising a centrally expanded portion fitting over the centrally expanded portion of the spoke arm and having flat portions 3$^b$ for clamping purposes, the ends of the hub section having pairs of inwardly directed tongues 6, whose adjacent edges bear against the outer sides of the U-shaped spoke arm, pairs of clamping bolts 5 coöperating with said portions 3$^b$, and a hub thimble 4 secured to the expanded central portion of the spoke arm; substantially as described.

12. A pulley comprising a rim, spoke arms approximately U-shape in cross section and connected with the rim, and hub sections coöperating with the spoke arms and each comprising a substantially U-shape clamp fitting upon said spoke arms and provided at each end with means closely engaging the same to prevent lateral displacement; substantially as described.

13. A pulley comprising a rim, spoke arms approximately U-shape in cross section and connected with the rim, and hub sections coöperating with the spoke arms and each comprising a substantially U-shape clamp fitting upon said spoke arms and provided at each end with depending parallel tongues 6 closely engaging the same to prevent lateral displacement; substantially as described.

14. A pulley comprising a rim, spoke arms approximately U-shape in cross section and connected with the rim, said spoke arms being centrally expanded to form the hub opening, and hub sections coöperating with the spoke arms and each comprising a substantially U-shape clamp having correspondingly expanded central portions fitting closely upon said spoke arms; substantially as described.

HENRY J. GILBERT.

Witnesses:
S. E. HIBBEN,
LOUIS B. ERWIN.